United States Patent
Palaez et al.

(10) Patent No.: US 7,283,489 B2
(45) Date of Patent: Oct. 16, 2007

(54) MULTIMEDIA HALF-DUPLEX SESSIONS WITH INDIVIDUAL FLOOR CONTROLS

(75) Inventors: Mariana Benitez Palaez, Naperville, IL (US); Anne Yin-Fee Lee, Naperville, IL (US); Stinson Samuel Mathai, Des Plaines, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1109 days.

(21) Appl. No.: 10/403,958

(22) Filed: Mar. 31, 2003

(65) Prior Publication Data
US 2004/0190489 A1 Sep. 30, 2004

(51) Int. Cl.
*H04B 7/00* (2006.01)

(52) U.S. Cl. .................. 370/277; 370/401; 370/328
(58) Field of Classification Search .............. None
See application file for complete search history.

(56) References Cited

U.S. PATENT DOCUMENTS

| 2004/0003046 A1* | 1/2004 | Grabelsky et al. ......... 709/206 |
| 2004/0125756 A1* | 7/2004 | Lepore et al. ............ 370/261 |

* cited by examiner

*Primary Examiner*—Bob A. Phunkulh

(57) ABSTRACT

A method of managing a multimedia call session conducted over a communications network (10) is includes: receiving a request to set-up the multimedia session over the communications network (10), including a plurality of media types; and, establishing a separate single media session for each media type included in the request, the established sessions being between a plurality of participating terminals (40, 50).

14 Claims, 2 Drawing Sheets

MULTIMEDIA HALF-DUPLEX SESSIONS WITH INDIVIDUAL FLOOR CONTROLS

FIELD

The present invention relates to the art of telecommunications. It finds particular application in conjunction with half-duplex multimedia communications utilizing a public data network (PDN), such as a packet switched data network (PSDN), and will be described with particular reference thereto. However, it is to be appreciated that the present invention is also amenable to other like applications and suited to other similar communication networks or environments.

BACKGROUND

Known end user communication devices in the telecommunications field, commonly referred to as user equipment, terminals, user agents, etc., are equipped to handle multiple types of communication media, such a device shall be referred to herein as a multimedia terminal (MMT). Conversely, a terminal which is equipped to handle only one type of media shall be referred to herein as a single media terminal (SMT), e.g., an ordinary telephone equipped to handle only voice communications, or a simple pager equipped to handle only text messages.

Regarding MMTs, wireless or mobile telephones, for example, are known which accommodate voice communications as well as text and static image media. Other known mobile MMTs that accommodate the transmission and/or reception of various combinations of audio, image, video and/or text media include wireless enabled personal digital assistants, wireless enabled notebook or laptop computers, etc. Additionally, line-based MMTs are also known, such as, suitably equipped general purpose computers (e.g., desktops) and/or video phones.

The text communications supported by many MMTs include, short message service (SMS), instant and/or text messaging, etc. Known protocols have been developed to manage and/or route these text communications over PSDNs, e.g., the Internet and the like. These networks have also been adapted and/or suitable protocols have been developed to manage and/or route packetized voice communications as well, e.g., via Voice Over Internet Protocol (VOIP) telephony. Similarly, known techniques and/or systems have been developed to transport image and video media over PSDNs. As is known in the art, a multimedia call session conducted over a PSDN includes the exchange of communications in a plurality of different media forms between the parties to the multimedia call session.

Push-to-talk (PTT) operation of terminals (in particular mobile terminals) has also been found useful in the telecommunications field. PPT service is a half-duplex mode of communication. Commonly, many communications are simultaneously bi-directional, also referred to as full-duplex, e.g., in a full-duplex two party voice call session, both parties can speak and hear each other at the same time. In contrast, half-duplex means that communications occur in only one direction at a time, e.g., only one party in a call session can be transmitting at a given time. Walkie-talkies, e.g., usually operate using a half-duplex mode of communication.

Typically, in a PTT operational mode, to control which party in a call session has transmission rights (referred to herein as "having the floor"), the user pushes or presses a PTT button while transmitting and then releases it when they are done. Once the current party having the floor releases their PTT button, another user may then push or press their PTT button to gain the floor (i.e., obtain transmission rights) and respond. In this way, it is known in which direction communications are to travel.

Because half-duplex sessions involve transport of communications in only one given direction at a particular time, as compared to full-duplex sessions which must support simultaneous bi-directional transport of communications, bandwidth conservation is advantageously realized. Accordingly, it has been deemed beneficial to extend PTT type services to multimedia call sessions, and particularly, to multimedia conference call sessions, conducted over a PSDN. However, heretofore, such an extension has not been suitably developed. For example, a problem can arise when, at a given time, a first party in a multimedia call session desires to have control of the floor or transmission rights with respect to a first media type and not a second media type, while a second party desires to have control of the floor with respect to the second media type and not the first media type. That is to say, no technique or system has been previously developed which supports individual or independent media specific floor controls for half-duplex multimedia call sessions.

The present invention contemplates a new and improved telecommunications method and/or system which overcomes the above-referenced problems and others.

SUMMARY

In accordance with an aspect of the present invention, a method of managing a multimedia call session conducted over a communications network is provided. The method includes: receiving a request to set-up the multimedia session over the communications network, including a plurality of media types; and, establishing a separate single media session for each media type included in the request, the established sessions being between a plurality of participating terminals.

In accordance with another aspect of the present invention, a system for managing a multimedia call session conducted over a communications network includes: means for receiving a request to set-up the multimedia session over the communications network, including a plurality of media types; and, means for establishing a separate single media session for each media type included in the request, said established sessions being between a plurality of participating terminals.

One advantage of the present invention is the ability to optionally provide media specific independent floor controls for half-duplex multimedia call sessions conducted over a PSDN.

Still further advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF PREFERRED EMBODIMENTS

Figure 1:
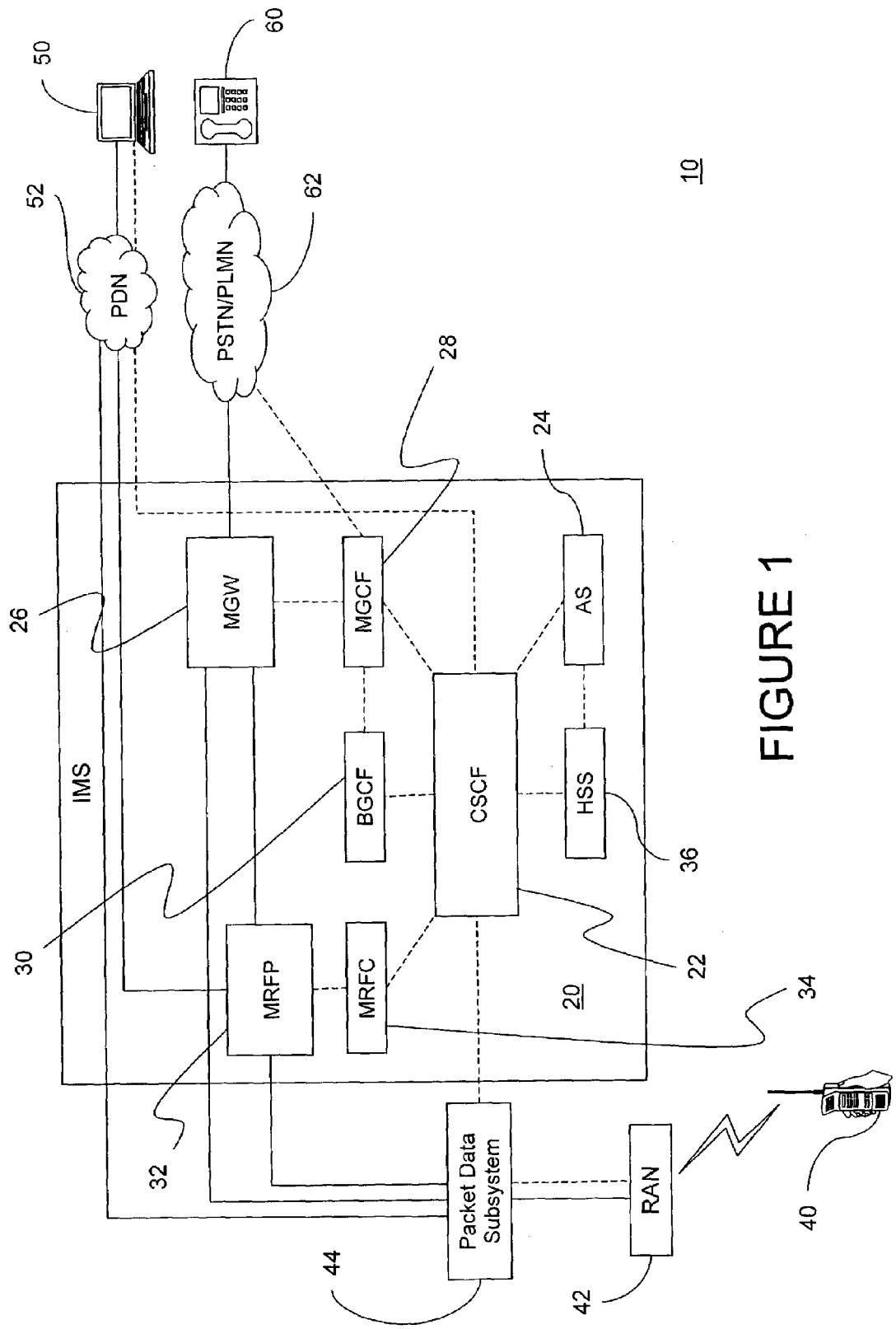
FIG. 1 is a diagrammatic illustration showing an exemplary telecommunications environment suitable for practicing aspects of the present invention.

For simplicity and ease of reference, the following acronyms shall be used in the present specification to refer to structural and/or functional network elements and/or entities, relevant telecommunications standards, protocols and/or services, terminology, etc., as they are commonly known in the telecommunications art, except to the extent they have been modified in accordance with aspects of the present invention:

3G—3$^{rd}$ Generation
3GPP—3$^{rd}$ Generation Partnership Project
3GPP2—3$^{rd}$ Generation Partnership Project 2
AAA—Authentication/Authorization/Accounting
AH—Address Handling
AS—Application Server
BGCF—Border Gateway Control Function
CCF—Call Control Function
CDMA—Code Division Multiple Access
CSCF—Call Session Control Function
HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MMT—Multimedia Terminal
MRFC—Multimedia Resource Function Controller
MRFP—Multimedia Resource Function Processor
PDN—Public Data Network
PLMN—Public Land Mobile Network
PSDN—Packet Switched Data Network
PSTN—Public Switched Telephone Network
PTT—Push-to-Talk
RAN—Radio Access Network
SIP—Session Initiation Protocol
SMS—Short Message Service
SMT—Single Media Terminal
SPD—Serving Profile Database
UMTS—Universal Mobile Telecommunications System
VOIP—Voice over IP
WLAN—Wireless Local Area Network With reference to FIG. 1, an optionally 3GPP/3GPP2 compliant telecommunications environment or network 10 is equipped and/or arranged to manage and/or route multimedia communications between terminals employing the same. Other suitable telecommunications environments, however, may be employed. The network 10 includes an IMS 20 that incorporates in the usual manner a number of network entities and/or elements, namely, one or more of a CSCF 22, AS 24, MGW 26, MGCF 28, BGCF 30, MRFP 32, MRFC 34, HSS 36. As is known in the art, the IMS 20 manages call sessions and provides and administers packet switching for multimedia communications within the network 10.

For exemplary purposes, an MMT 40 (nominally the first terminal) is shown as a mobile MMT (namely, a multimedia enabled mobile phone as is commonly known) that is operatively connected to the IMS 20 via a RAN 42. The RAN 42, as it is known, is that portion of a mobile network that handles subscriber access, including radio base stations and control and concentration nodes, i.e., the portion relating to "over the air" communications between the mobile terminal and the network base station. A packet data subsystem 44 interfaces the RAN 42 with the IMS 20 and PDN 52 in the usual manner.

Another MMT 50 (nominally the second terminal) is shown as a laptop or notebook type computer operatively connected to the IMS 20 via a PDN 52. The MMT 50 optionally employs a WLAN or wire line, in the usual manner, to operatively connect to the PDN.

An SMT 60 (nominally the third terminal) is shown as an ordinary telephone equipped to handle only voice communications. The SMT 60 is operatively connected to the IMS 20 via a PSTN/PLMN 62.

Only a single first, second and third terminal are shown in FIG. 1 for the purpose of simplicity herein. However, it is to be appreciated that typically a plurality of such terminals are similarly situated. Additionally, while depicted as a specific type of MMT or SMT, other like terminals are also contemplated.

With continuing reference to FIG. 1, the bearer paths, as are known in the art, that carry and/or relay the communication traffic and/or user information intended to be transmitted from one terminal to another are shown as solid lines. Control paths, as are known in the art, carry and/or relay associated signaling and/or control commands or messages to and between appropriate network elements and/or entities such that call sessions are properly managed and routed. The control paths are shown as dashed lines in FIG. 1. Suitably, SIP and/or other appropriate known protocols are used on the control and bearer paths, respectively, e.g., the known H.248 protocol is suitably employed for media gateway controls. The CSCF 22, BGCF 30, MGCF 28, MRFC 34 and AS 24 comprise the call control and signaling functionality for the IMS 20, while the bearer paths interface with the MRFP 32 and MGW 26 to provide and support interconnectivity to external networks and/or subsystems, such as, the packet data subsystem 44, PDN 52 and PSTN/PLMN 62.

The CSCF 22 supports and controls multimedia sessions. The CSCF 22 invites the MGCF 28 and/or MRFC 34 to call sessions to control the establishment and maintenance of bearer paths for call sessions, e.g., by adding, modifying or deleting appropriate bearer paths for respective call sessions. The CSCF 22 is the signaling entity for call session control. It manages sessions (e.g., using SIP and/or other appropriate call/session establishment protocols), provides features and services and coordinates with other network elements for session control, service control and resource allocation. The functions performed by the CSCF 22 are Incoming Call Gateway (ICGW), Call Control Function (CCF), Serving Profile Database (SPD) and Address Handling (AH).

The ICGW function acts as a call session entry point and routes incoming calls.

The CCF executes call setup/termination and state/event management. It interacts with the MGCF 28 for calls to/from the PSTN/PLMN 62, and with the BGCF 30 for calls to the PSTN/PLMN 62 to determine the appropriate MGCF 28 to use. It also controls the MRFP 32 via the MRFC 34 (which interprets information or signals coming from the CSCF 22 and controls the MFRP 32 accordingly) in order to support conferencing and other multi-party services. SIP level registrations from subscribers are processed in CCF. The CCF may provide service trigger mechanisms to the AS 24 to invoke services provided thereby (either locally, at the AS 24, or elsewhere). It also reports call events for billing, auditing, intercept or other purposes, and may query the AH function to check whether a requested communication is allowed given the current subscription.

The SPD function interacts with the HSS 36 to receive and cache user profile information, and the AH function performs address handling, including address analysis, translation, modification (when appropriate) and mapping.

The MGW 26 acts as a bearer path interface between the IMS 20 and externals networks and/or subsystems, and provides translation resources and resources for modifying the bearer stream (e.g., encoding, transcoding, compression, packetization, depacketization, etc.). It interacts with the MGCF 28 (which interprets signaling coming from the CSCF 22 and controls the MGW 26 accordingly) in order to achieve resource allocation, bearer path control, and payload processing. The MGCF 28 communicates with the CSCF 22 in order to control the call state for media channels on one or more MGWs and performs conversions between legacy and 3G UMTS/CDMA network call control protocols. Similarly, the MRFC 34 controls the media stream resources in the MRFP 32 which also acts as a bearer path interface between the IMS 20 and external networks and/or subsystems, however, being able to provide for conferencing or multiple party communications or other more advanced media services (relative to the MGW 26).

The HSS 36 maintains subscriber and system related data, user profiles, locations, etc. Optionally, the HSS 36 also contains what is known as the HLR functionality and/or AAA function. Suitably, the HSS database includes: user identification, via numbering and addressing information; user security information, including network access control information for authentication and authorization; user location information for user registration and locating; and a user profile, including identification of the services subscribed to and other service specific information.

Figure 2:
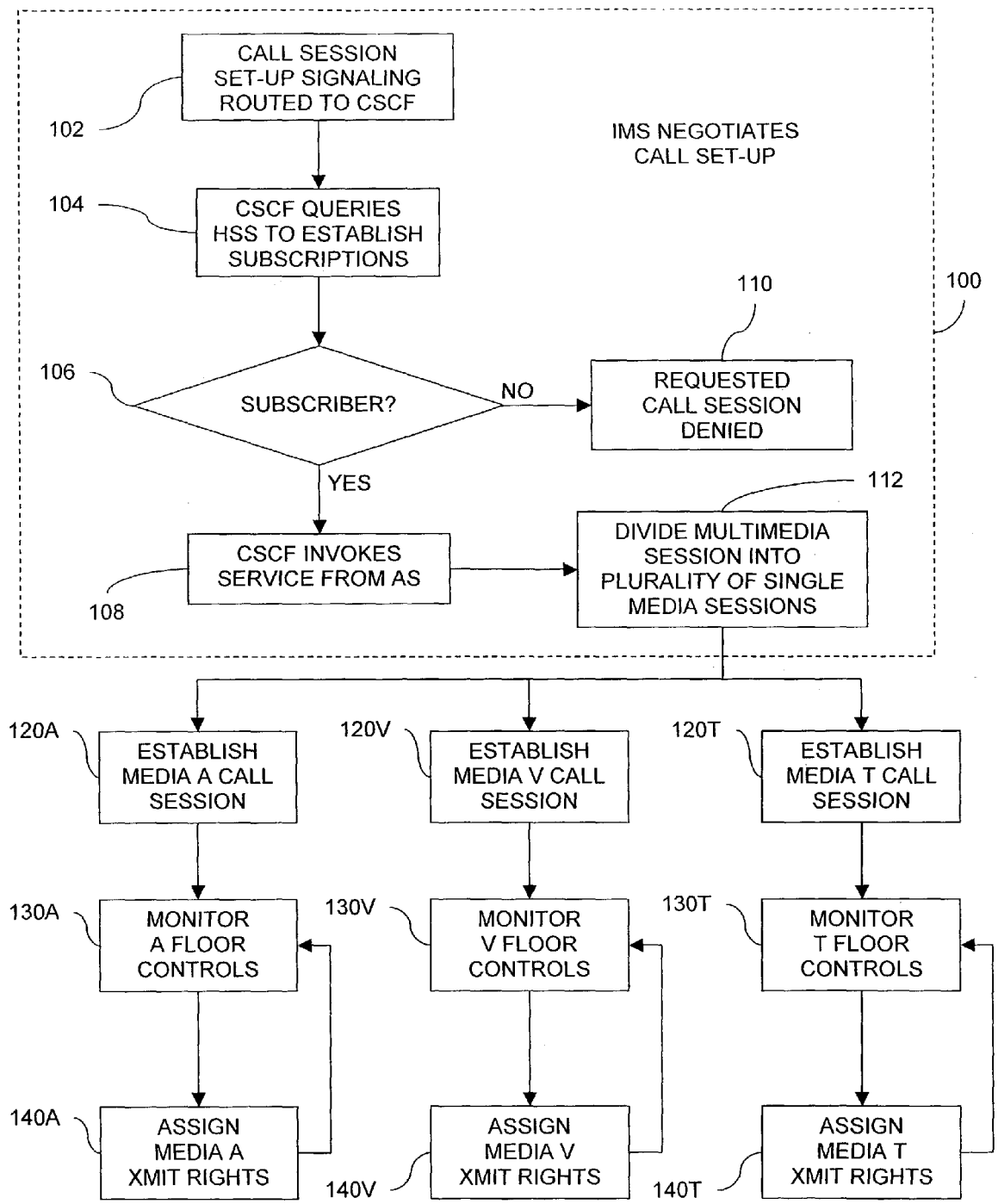
FIG. 2 is a flow chart illustrating a call session management process and/or method with independent media specific floor controls for a half-duplex multimedia call session conducted over a PSDN in accordance with aspect of the present invention.

With reference now to FIG. 2 and continuing reference to FIG. 1, a half-duplex multimedia call session carried out over the IMS 20 in accordance with aspects of the present invention is described by way of example. Without loss of generality, in the present example, the first terminal 40 shall be considered the calling party (user A) and the called party (user B) shall be considered as the second terminal 50. While for the purposes of simplicity and clarity herein the following discussion only refers expressly to an exemplary half-duplex multimedia call session involving two parties, it is to be appreciated that it can similarly be extended and/or applied to half-duplex multimedia conferencing sessions involving greater than two parties.

Initially, at step 100, a call set-up is negotiated by the IMS 20 between the first and second terminals 40 and 50. Suitably, at sub-step 102, the calling party (user A) initiates a half-duplex multimedia call session by placing a call via appropriate operation of their MMT 40 whereupon suitable call set-up signaling is transmitted to the CSCF 22 for establishing the requested call session with the MMT 50 over the IMS 20. The set-up signaling optionally identifies the requested call session as a half-duplex multimedia session employing individual and/or independent media specific floor controls.

Upon receipt of the call-set up signaling, the CSCF 22 queries the HSS 36 at sub-step 104 to check and/or establish user A's identity, access rights and/or other like details as is customary for initial call session set-up. In addition, user A's profile maintained at the HSS 36 is checked to confirm and/or establish that user A subscribes to an appropriate service or services employed for establishing the requested call session. Additionally, the called party's profile (i.e., user B's profile) may be similarly checked to confirm and/or establish that the called party subscribes to the appropriate service or services employed for establishing the requested call session.

As determined in decision sub-step 106, if one or both parties subscribe to the appropriate service(s) (i.e., if it is determined that appropriate subscriptions are held by or otherwise in place for the parties to the call session being set-up), then at sub-step 108 the CSCF 22 invokes one or more services from the AS 24 that provide suitable functionality from the IMS side for implementation of a half-duplex multimedia service with independent media specific floor controls. Otherwise, the flow proceeds to sub-step 110 where, e.g., the requested call session is denied.

Following invocation of the appropriate service(s) from the AS 24, at sub-step 112, the multimedia call session requested is divided into a plurality of single media sessions, suitably, including one single media session for each media type to be included. At steps 120A, 120V and 120T, the plurality of single media sessions are established between the parties. That is to say, a session is established over the IMS 20 for each of the different media types. As shown, for example, a separate session is established for media types A, V and T, which optionally represent audio (A), video (V) and text (T) media, respectively. To create the sessions, under the direction of appropriate IMS signaling and/or controls, a suitable half-duplex bearer path is established between the MMTs 40 and 50 through the MGW 26 and/or the MRFP 32 for each media specific session. Accordingly, the media types communicated between the MMTs 40 and 50 are transported via their respective bearer paths.

Next, at steps 130A, 130V and 130T, the respective floor controls are monitored by the IMS 20. That is to say, the MMTs 40 and 50 are each provisioned with PTT style buttons that request and maintain floor control for the respective media types supported by the MMTs 40 and 50. For example, the MMTs 40 and 50 optionally support A, V and T media. Accordingly, each MMT is provisioned with separate buttons (e.g., a PPT button for audio media, a push-to-video button for video media, and a push-to-message button for text media) that are pressed or otherwise activated by the user to request the media floor associated with the respective button. Suitably, activation of a button on an MMT sends signaling from the MMT to the CSCF 22 that indicates that the MMT is requesting the floor to obtain transmission rights for the corresponding media, and so long as the button remains activated or pressed, floor control and/or transmission rights for that media are maintained or held by the MMT on which the button is pressed.

At steps 140A, 140V and 140T, transmission rights are independently assigned by the IMS 20 to each MMT 40 and 50 for each of the media specific sessions in accordance with the respective monitored floor controls. Suitably, the respective half-duplex bearer paths supported by the MRFP 32 and/or MGW 26, under the direction of appropriate IMS signaling and/or controls, are configured and/or reconfigured to permit transmission from the MMT which has the floor for that media specific session. Notably, the transmission rights for the respective single media sessions are optionally assigned to different MMTs. For example, via appropriate independent configuration of the respective half-duplex bearer paths for each single media session in accordance with the monitored floor controls corresponding thereto, the MMT 40 may have transmission rights for audio media at the same time the MMT 50 has transmission rights for video media.

To further appreciate the operation and/or capabilities of the IMS 20 providing the half-duplex multimedia communications service with independent floor controls for different media types, consider the following exemplary scenario of conferencing between three users subscribing to the service, nominally, user X, user Y and user Z. For purposes of this example, all three users are assumed to have MMTs that support half-duplex communications of audio and video media. Each MMT, therefore, is provisioned with a PPT button that is selectively activated and held by its user to request and maintain the floor and/or transmission rights for audio media and a push-to-video button that is selectively activated and held by its user to request and maintain the floor and/or transmission rights for video media.

Via appropriate operation of their MMT, user X initiates a half-duplex multimedia conference call to the group including audio and video media. However, given that the conference call involves half-duplex communications, the idea of the same user having the floor for both audio and video media may not be desirable. Rather, it may be desired that transmission rights be independently assigned to users for each media type. Having different sessions for audio and videos greatly increases the flexibility of the service. Accordingly, the call set-up is negotiated such that all three users, X, Y and Z participate in the call and separate half-duplex sessions are established for the audio and video media.

In this exemplary scenario, user X is at a lab having a problem setting up an experiment. Accordingly, user X makes the aforementioned conference call to user Y who is an expert in setting up such experiments, but is unfamiliar with the lab, and user Z who is familiar with the lab, but lack expertise in setting up such experiments. Accordingly, it may be advantageous for user X to have the floor for video media so that user X is permitted to transmit video of the lab to both users Y and Z thereby showing them the problem user X is having. At the same time, it may be advantageous for users Y and Z to alternately have the floor for audio media so that they are alternately permitted to transmit audible instructions and/or explanations to the other parties on the conference call.

In this situation then, user X would press and hold the push-to-video button on their MMT thereby claiming control of the floor for the video media session. Therefore, the half-duplex bearer paths for the separately established video media conferencing session are configured to permit transmission of video media from user X's MMT to the MMTs of users Y and Z. Simultaneously, user Y would press and hold the PPT button on their MMT thereby claiming control of the floor for the audio media session. Therefore, the half-duplex bearer paths for the separately established audio media conferencing session are configured to permit transmission of audio media from user Y's MMT to the MTTs of users X and Z. When user Y is done speaking, they cease pressing the PPT button on their MMT thereby releasing the audio media floor. If user Z then has something to add, user Z would press and hold the PTT button on their MMT thereby claiming control of the floor for the audio media session. Accordingly, the half-duplex bearer paths for the separately established audio media conferencing session are reconfigured to permit transmission of audio media from user Z's MMT to the MMTs of users X and Y. Similarly, by the users selectively activating the respective PPT and push-to-video buttons on their MMTs, effective control of the audio and video floors are independently transferred between the users as desired. In this manner, one of the users is independently assigned transmission rights for each media type in accordance with their selection as indicated by the activation of their respective PPT and push-to-video buttons.

In accordance with alternate embodiments of the present invention, it is contemplated that one or more of the separately established single media sessions is optionally provisioned for full-duplex communications. For example, in the three way conference call of the foregoing scenario, optionally, the audio media session includes full-duplex communication between the three users. Accordingly, simultaneous audio transmission is permitted between the parties, yet video media transmission is limited to the user having control of the video floor. In this manner, full-duplex communication may be employed where it is useful or it is otherwise desire, while bandwidth and/or resource conservation is realized by employing half-duplex communication for media types where full-duplex communication is not useful or it is otherwise not desired. Furthermore, utilization of divided media sessions offers flexibility and bandwidth/resource conservation in other ways. Suitably, a party may desire and/or be permitted to participate in one of the separate media sessions, but not in another. For example, a party or user may participate in the audio session and not the corresponding video session because their terminal is not equipped to support video media.

It is to be appreciated that in connection with the particular exemplary embodiments presented herein certain structural and/or function features are described as being incorporated in and/or with defined elements and/or components. However, it is contemplated that these features may, to the same or similar benefit, also likewise be incorporated in and/or with other elements and/or components and/or in other various embodiments where appropriate. It is also to be appreciated that different aspects of exemplary embodiments may be selectively mixed and matched as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of managing a multimedia call session conducted over a communications network, said method comprising:

(a) receiving a request to set-up the multimedia session over the communications network, including a plurality of media types (receiving a request to initiate a multimedia session, see paragraph); and,
(b) establishing a separate single media session for each media type included in the request, said established sessions being between a plurality of participating terminals;
wherein the established single media sessions are half-duplex sessions and the method further comprises:
(c) monitoring each of the established sessions for corresponding floor control signals received from the participating terminals; and
(d) assigning transmission rights to the participating terminals in accordance with the monitored floor controls, wherein the transmission rights for each established session are assigned independently of assignments for other established sessions.

2. The method of claim 1, further comprising:
configuring bearer paths for the established sessions, each of said bearer paths transporting communications between the participating terminals for the media type corresponding to the established session for which it is configured.

3. The method of claim 2, wherein each bearer path is configured for half-duplex communication between the participating terminals such that the participating terminals are transmission enabled independently for each of the established sessions.

4. The method of claim 3, further comprising:
monitoring each of the established sessions for corresponding floor control signals received from the participating terminals, wherein the bearer paths are configured based on the monitored floor controls such that one participating terminal designated as having the floor for each established session is transmission enabled for that established session.

5. The method of claim 4, further comprising:
reconfiguring the bearer paths for the established sessions in accordance with changes in the monitored floor controls.

6. The method of claim 1, wherein at least one of the established single media sessions is a half-duplex session and at least another one of the established single media sessions is a full-duplex session.

7. The method of claim 1, wherein the plurality of participating terminals includes more than two terminals.

8. A system for managing a multimedia call session conducted over a communications network, said system comprising:

means for receiving a request to set-up the multimedia session over the communications network, including a plurality of media types; and
means for establishing a separate single media session for each media type included in the request, said established sessions being between a plurality of participating terminals;
wherein the established single media sessions are half-duplex sessions and the system further comprises:
means for monitoring each of the established sessions for corresponding floor control signals received from the participating terminals; and
means for assigning transmission rights to the participating terminals in accordance with the monitored floor controls, wherein the transmission rights for each established session are assigned independently of assignments for other established sessions.

9. The system of claim 8, further comprising:
means for configuring bearer paths for the established sessions, each of said bearer paths transporting communications between the participating terminals for the media type corresponding to the established session for which it is configured.

10. The system of claim 9, wherein each bearer path is configured for half-duplex communication between the participating terminals such that the participating terminals are transmission enabled independently for each of the established sessions.

11. The system of claim 10, further comprising:
means for monitoring each of the established sessions for corresponding floor control signals received from the participating terminals, wherein the bearer paths are configured based on the monitored floor controls such that one participating terminal designated as having the floor for each established session is transmission enabled for that established session.

12. The system of claim 11, further comprising:
means for reconfiguring the bearer paths for the established sessions in accordance with changes in the monitored floor controls.

13. The system of claim 8, wherein at least one of the established single media sessions is a half-duplex session and at least another one of the established single media sessions is a full-duplex session.

14. The system of claim 8, wherein the plurality of participating terminals includes more than two terminals.

* * * * *